United States Patent [19]

Lough et al.

[11] Patent Number: 4,518,405
[45] Date of Patent: May 21, 1985

[54] CLEAN ROOM WITH REPLACEABLE FILTER AND A SEAL CUTTING MECHANISM

[75] Inventors: Wendell J. Lough; Donald E. Bishop, both of Hampstead, N.H.

[73] Assignee: Weber Technical Products, Division of Craig Systems Corporation, Amesbury, Mass.

[21] Appl. No.: 562,421

[22] Filed: Dec. 19, 1983

[51] Int. Cl.³ .............................................. B01D 46/10
[52] U.S. Cl. .................................... 55/385 A; 55/483; 55/484; 55/502; 55/DIG. 31
[58] Field of Search ...................... 55/355, 385 A, 483, 55/484, 502, 508, DIG. 31; 98/40 D; 52/99, 127.1

[56] References Cited

U.S. PATENT DOCUMENTS

| | | | |
|---|---|---|---|
| 3,323,437 | 6/1967 | Knab | 55/484 |
| 3,522,724 | 8/1970 | Knab | 55/385 A |
| 3,812,370 | 5/1974 | Lavioiette | 55/483 |
| 3,986,850 | 10/1976 | Wilcox | 55/355 |
| 4,175,936 | 11/1979 | Lough et al. | 55/385 A |
| 4,225,328 | 9/1980 | Stiehl | 55/502 |
| 4,344,265 | 8/1982 | Davidson | 52/127.1 |

Primary Examiner—David L. Lacey
Attorney, Agent, or Firm—Price, Heneveld, Huizenga & Cooper

[57] ABSTRACT

An air filtering system of the type used in clean rooms and the like supportable from a ceiling. The unit includes a supporting frame with an opening therethrough, the supporting frame being suspended from the ceiling by cables or the like. A filter having a filter frame therearound is placed within and across the opening in the support frame. A cutting wire is positioned between the supporting frame and the filter frame around the periphery of the opening. One end of the wire is free and extends below the two frames. The other end is fixedly secured to either the filter or support frame. A cuttable seal is applied between the filter and support frames around the periphery of the opening. Clips are also provided to hold the filter within the opening. When one wishes to remove the filter, the free end of the cutting wire is pulled, cutting the seal around the periphery of the opening, thereby allowing the filter and filter frame to be removed from the support frame opening.

11 Claims, 9 Drawing Figures

U.S. Patent May 21, 1985 Sheet 1 of 3 4,518,405
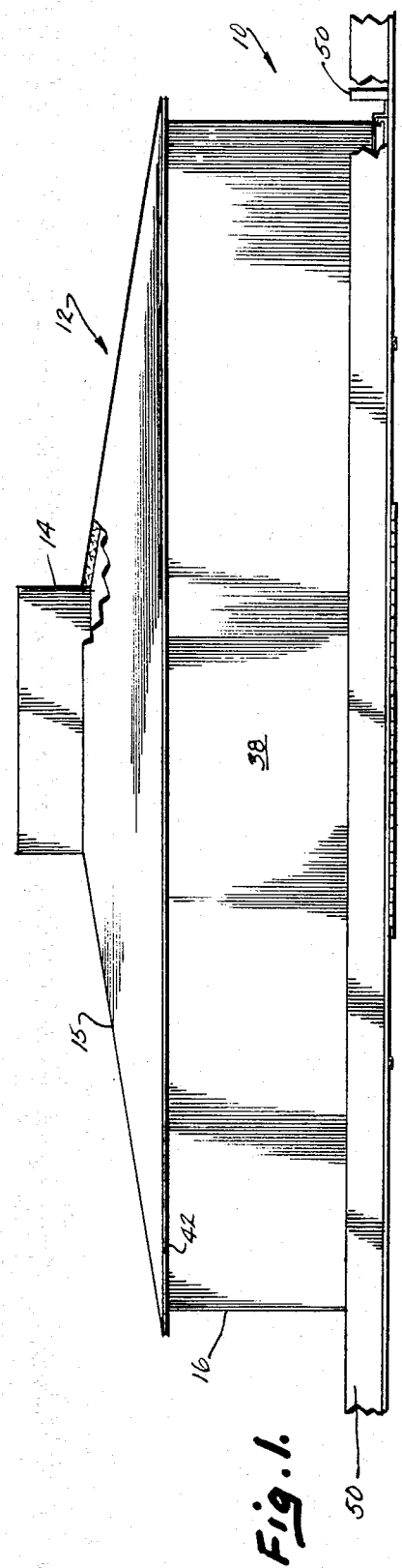
Fig. 1.
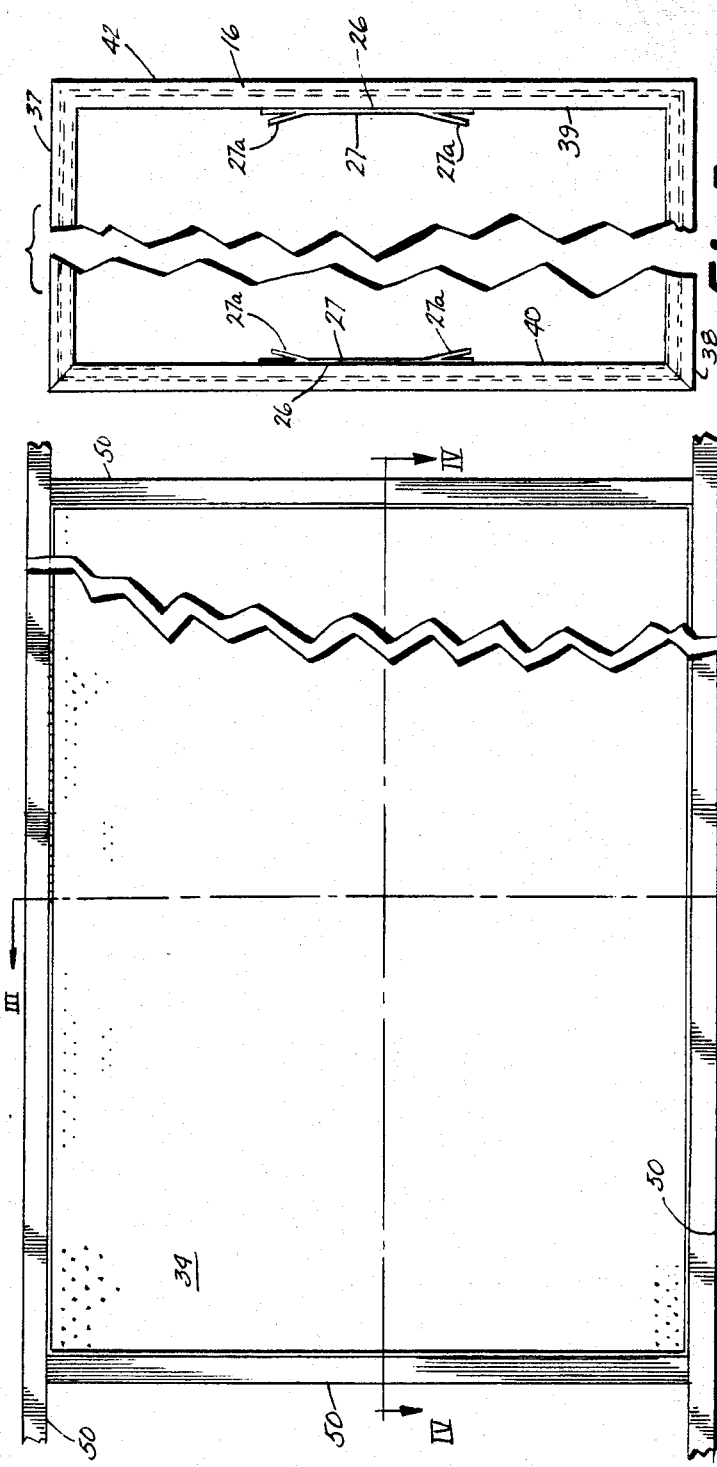
Fig. 5.
Fig. 2.

CLEAN ROOM WITH REPLACEABLE FILTER AND A SEAL CUTTING MECHANISM

BACKGROUND OF THE INVENTION

The present invention relates to clean rooms and, more particularly, to filter units supportable in a ceiling or wall gridwork adjacent a clean work area.

In the manufacture of semiconductor chips, electronic components, pharmaceuticals and in the performance of certain surgical procedures, it is necessary or desirable to control the environmental conditions within the work area, especially dust conditions. Such controlled work areas are commonly called clean rooms.

In one typical type of clean room construction, the ceiling of the room includes a plurality of side-by-side air filtration or diffuser units. Each of the units includes an individual hood or air plenum with a high-efficiency filter positioned across the opening thereof at or near the clean room surface. Air is pumped into each plenum and through each filter, the particulate matter being removed in the filter. Each unit is supported on an inverted T-bar type ceiling gridwork. This type of unit is referred to herein as an individual plenum unit because each filter has its own plenum.

Another type of clean room construction involves supporting a plurality of high-efficiency filters within a gridwork suspended above the work area in the clean room and below the true ceiling of the room such that the filter gridwork extends between the four sidewalls of the room. The area between the filter gridwork and the true ceiling comprises a common plenum into which air is pumped for filtration downwardly through the filters. This second type of construction will be called common plenum construction because a plurality of filters share the same plenum.

The filters employed in either type of construction are HEPA filters. These filters ordinarily have particulate efficiencies exceeding 99.97% for 0.3 micron diameter particles as determined by the Army Chemical Corps D.O.P. test.

The individual filters, regardless of the type of system employed, must be sealed to the surrounding structure to prevent unfiltered air from short-circuiting from the plenum, common or individual, directly into the room. This is typically accomplished by running a bead of silicone caulk or similar material between the filter frame at the room-facing surface thereof and the surrounding support structure. Because of the relatively high pressures involved and the desirability of preventing any possible leakage, the sealant material is applied liberally in such fashion that it extends upwardly between the filter frame and the surrounding structure a substantial distance.

When it becomes necessary to replace the filter, the sealant material must be cut or otherwise fractured to permit removal of the filter from the surrounding structure. This has been accomplished in the past, typically, by use of a putty knife or similar tool which has been forced by hand between and around the filter frame and surrounding structure. This, as will be readily appreciated by those skilled in the art, is a most time-consuming and unpleasant task.

Therefore, there is a need for a clean room air diffuser filter unit which can be quickly and easily replaced, even by an unskilled worker. Furthermore, such a unit must have a complete, effective seal to prevent the short-circuiting of contaminants around the filter. Finally, the unit must be economical to manufacture.

The present invention is adapted for use in conjunction with a filter unit having a frame therearound and a supporting frame within which the filter unit is positioned, the peripheral area between the filter frame and support frame being sealed by a cuttable seal such as a silicone-based caulk to prevent air from short-circuiting between the filter frame and the support frame. It comprises an elongated, flexible cutting member such as a braided wire having one end thereof secured to the filter frame or support frame on one side of the cuttable seal, having the other end thereof exposed and grasped at the other side of the cuttable seal and having the intermediate length thereof positioned about the periphery of the filter frame on the said one side of the cuttable seal. When it is desired to remove the filter unit from the support frame, the exposed end of the cutting member is grasped and pulled progressively, causing the intermediate length to cut through the seal about the periphery of the filter frame.

BRIEF DESCRIPTION OF THE DRAWINGS

FIG. 1 is a partially broken, side elevation of an improved individual plenum diffuser unit constructed in accordance with the present invention;

FIG. 2 is a fragmentary, bottom view of the diffuser unit shown in FIG. 1;

FIG. 5 is a fragmentary, top view of the filter supporting frame of the unit shown in FIG. 1;

DETAILED DESCRIPTION OF THE PREFERRED EMBODIMENT

Figure 3:
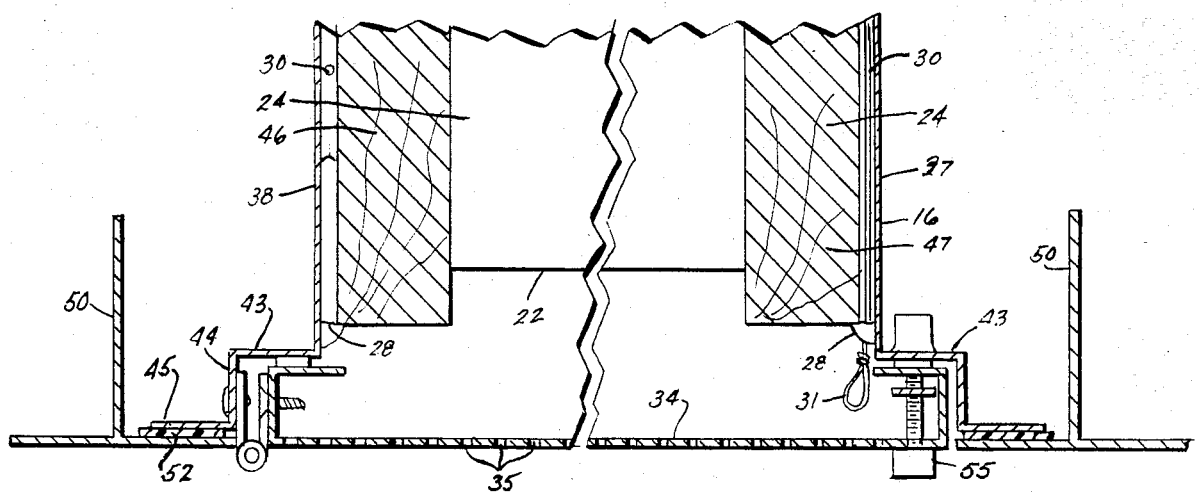
FIG. 3 is a fragmentary, cross-sectional view taken along line III—III of FIG. 2.
Figure 4:
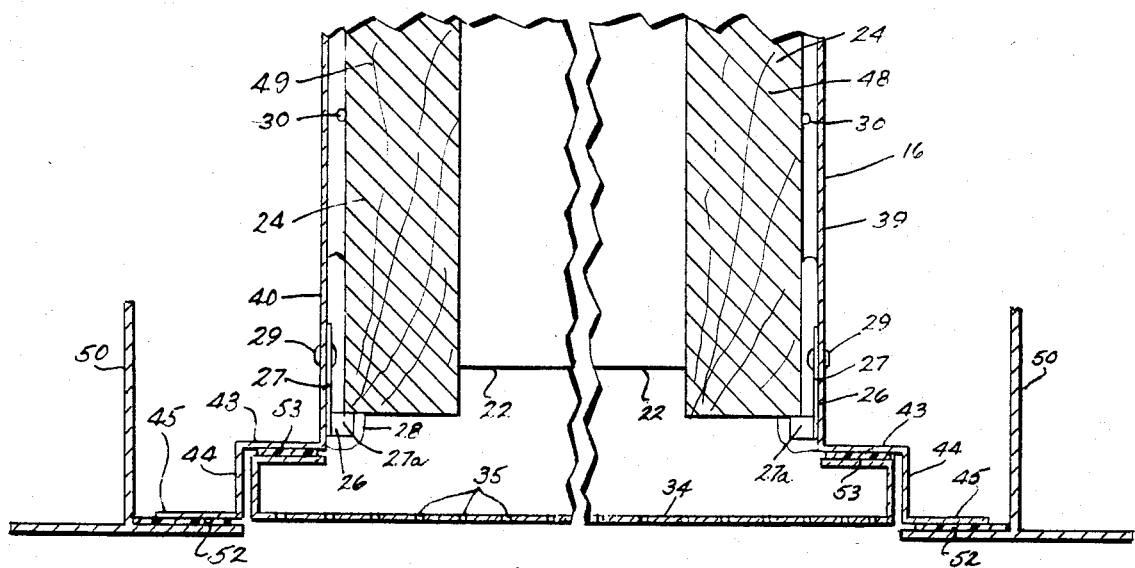
FIG. 4 is a fragmentary, cross-sectional view taken along line IV—IV of FIG. 2.
Figure 6:
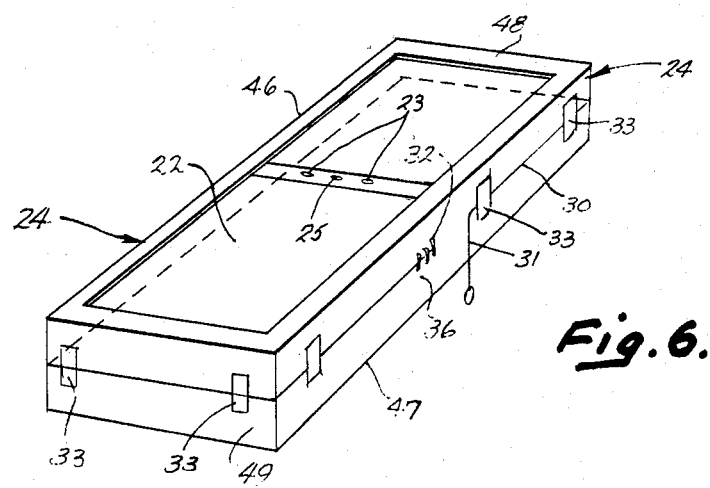
FIG. 6 is a perspective view of the filter frame and filter of the present invention.

A preferred embodiment of the individual plenum diffuser unit in accordance with the present invention is illustrated in FIGS. 1 and 2 and generally designated 10. As shown in FIGS. 1 and 2, the diffuser unit 10 has a plenum or downwardly opening hood 12 having a stack 14 connectable to a suitable air duct (not shown), a downwardly and outwardly diverging section 15 and a supporting frame 16. Supported within the supporting frame 16 by clip means such as clips 26 (FIG. 5) is a filter panel 20 having a HEPA filter 22 and a frame 24. As shown in FIGS. 3 and 4, a cuttable seal 28 is applied between filter frame 24 and supporting frame 16 to effect a seal between the two. The cuttable seal is preferably a silicone caulk. Finally, a cutting wire 30, shown in FIG. 6, is secured at a fixed end 32 to the filter frame and extends virtually completely around the periphery of the filter frame between that frame and the supporting frame above cuttable seal 28. A free end 31 of cutting wire 30 extends through seal 28 and terminates in a loop. When the loop is pulled, cutting wire 30 will progressively cut the seal 28 around the periphery of filter frame 24 and supporting frame 16. The filter frame can then be removed by disengaging clips 26.

In the presently preferred construction for the individual plenum unit, the diverging portion 15 and the stack 14 are made from sheet metal as a separate unit from support frame 16. The details of the contruction of the basic structure of the diverging section 15 and stack 14 may be found in U.S. Pat. No. 3,323,437, entitled FILTER SYSTEM, issued to Knab on June 6, 1967. In particular, a damper (not shown) can be provided within diverging section 15.

As best seen in FIGS. 3, 4 and 5, supporting frame 16 is also fabricated from sheet metal and includes sidewalls 37, 38 and end walls 39 and 40. Support frame 16 includes a continuous, peripheral, horizontal, outwardly projecting upper flange 42, shown in FIGS. 1 and 5, which connects with diverging portion 15. Support frame 16 also has a lower, peripheral, outwardly projecting flange 43. A downwardly projecting flange 44 extending around the outer periphery of flange 43 is provided so that flanges 43 and 44 form an angled region which creates a recess in which a grill 34 nests. A flange 45 projecting outwardly from flange 44 is provided so that the entire diffuser unit shown in FIG. 1 can rest on T-shaped frame members 50, standard ceiling suspension member, suspended directly from the clean room ceiling in a conventional fashion.

In order to seal effectively the space above the suspended diffuser unit from the space below it and vice versa, gaskets 52 are provided between flange 45 and T-frame members 50. Gaskets 52 can be made from a foamed plastic material such as foamed polyvinylchloride or polyurethane. This type of seal is sufficient with the individual plenum units since the air pressure, between the hoods, is negative with respect to that of the room. Any leakage, thus, is upward out of the room.

Gaskets 53 between grill 34 and flange 43 are provided to insure that the air will not bypass around grill 34. Thus, the air will be forced through holes 35 in grill 34, and a substantially laminar downward flow is established. Grill 34 is secured to the bottom of the unit by hinge 54 and screw 55. Grill 34 can be moved out of the way by removing screw 55 and pivoting the grill on hinge 54.

Filter frame 24 is disposed within the opening formed by sidewalls 37 and 38 and end walls 39 and 40 of support frame 16. Filter panel 20 comprises a frame 24 having side frame members 46 and 47 and end frame members 48 and 49. Frame 24 is made from a suitable material such as wood, and HEPA filter 22 is positioned in and sealed to frame 24. Preferably, D.O.P. test ports 23 are provided to test the filter efficiency of the filter periodically. A standard damper adjust port 25 may also be provided to adjust the damper.

Filter panel 20 is held within support frame 16 by clips 26, shown in FIGS. 4 and 5. Clips 26 each include a flat portion 27 which is riveted with rivets 29 or otherwise secured to an end wall of a support frame. Extending inwardly toward the opening within support frame 16 from flat portion 27 are tabs 27a. Tabs 27a are resilient such that they are depressable outwardly against end walls 39 or 40 so that filter panel 20 can be raised into support frame 16, but they must also return to their original positions, shown in FIGS. 4 and 5, so that they engage the bottom of frame 24 to hold filter panel 20 in the raised position within support frame 16, as shown in FIG. 4.

Before filter panel 20 is raised into support frame 16, a cutting wire 30, shown in FIG. 6, is releasably secured to the periphery of filter frame 24 by releasable securement means such as masking tape strips 33. One end 32 of wire 30 is secured fixedly to filter frame 24 by staples 36. As will become apparent, the fixed end 32 of wire 30 could also be fixedly secured to a sidewall or end wall of support frame 16. Cutting wire 30 may be either of the single strand or braided variety.

Wire 30 also has a free end 31 which extends downwardly into a loop for ease of gripping. Note, as shown in FIG. 6, that the free end and fixed end of cutting wire 30 are located close to each other for reasons which will become apparent.

After wire 30 is in position, filter panel 20 is raised into support frame 16 by deflecting tabs 27a on clips 26 outwardly. Once filter panel 20 is above tabs 27a, tabs 27a are released and filter panel 20 is permitted to rest thereon supported at each end, as shown in FIG. 4.

A cuttable seal 28 is then applied around the periphery of filter frame 24 between filter frame 24 and support frame 16, as shown in FIGS. 3 and 4. Care should be taken to insure that the free end 31 of cutting wire 30 extends through and is enveloped by seal 28, as shown in FIG. 3, for reasons which will become apparent. Seal 28 should also be applied completely to envelop clips 26, as shown in FIG. 4, to provide a complete seal. The seal should extend upwardly a sufficient distance in the narrow gap between the filter and support frame, as shown in FIGS. 3 and 4, to prevent the pressurized air above the filter from dislodging the seal.

Because thermal changes will cause the wood filter frame to expand to a different degree than the sheet metal frame, the seal should be made from a resilient, stretchable material. Seal 28 is preferably applied in viscous liquid form with a caulking gun and is made preferably from a silicone-based caulking compound. It is readily apparent that other types of materials may be used instead of silicone caulk.

An airtight seal is thereby achieved between filter frame 24 and support frame 16. Therefore, when pressurized air is applied through hood 12, the air will be forced through HEPA filter 22 and will not be bypassed or short-circuited between filter frame 24 and support frame 16.

To replace filter panel 20, grill 34 is released by removing screw 53 and pivoting the grill downwardly on hinge 54, shown in FIG. 3. The loop on the free end 31 of cutting wire 30 is grasped and pulled, the tape strips 33 releasing the cutting wire, and the cutting wire is pulled downwardly along the periphery of filter frame 24, thereby cutting the seal 28 between the filter frame and support frame 16. The filter panel 20 is then removed by depressing tabs 27a on clips 26, releasing filter panel 20 from support frame 16. The silicone remaining on the support frame can easily be removed with a putty knife with the filter removed. A new filter panel can then be installed in place of the old one the same way the original panel was initially installed.

MODIFICATIONS

Figure 7:
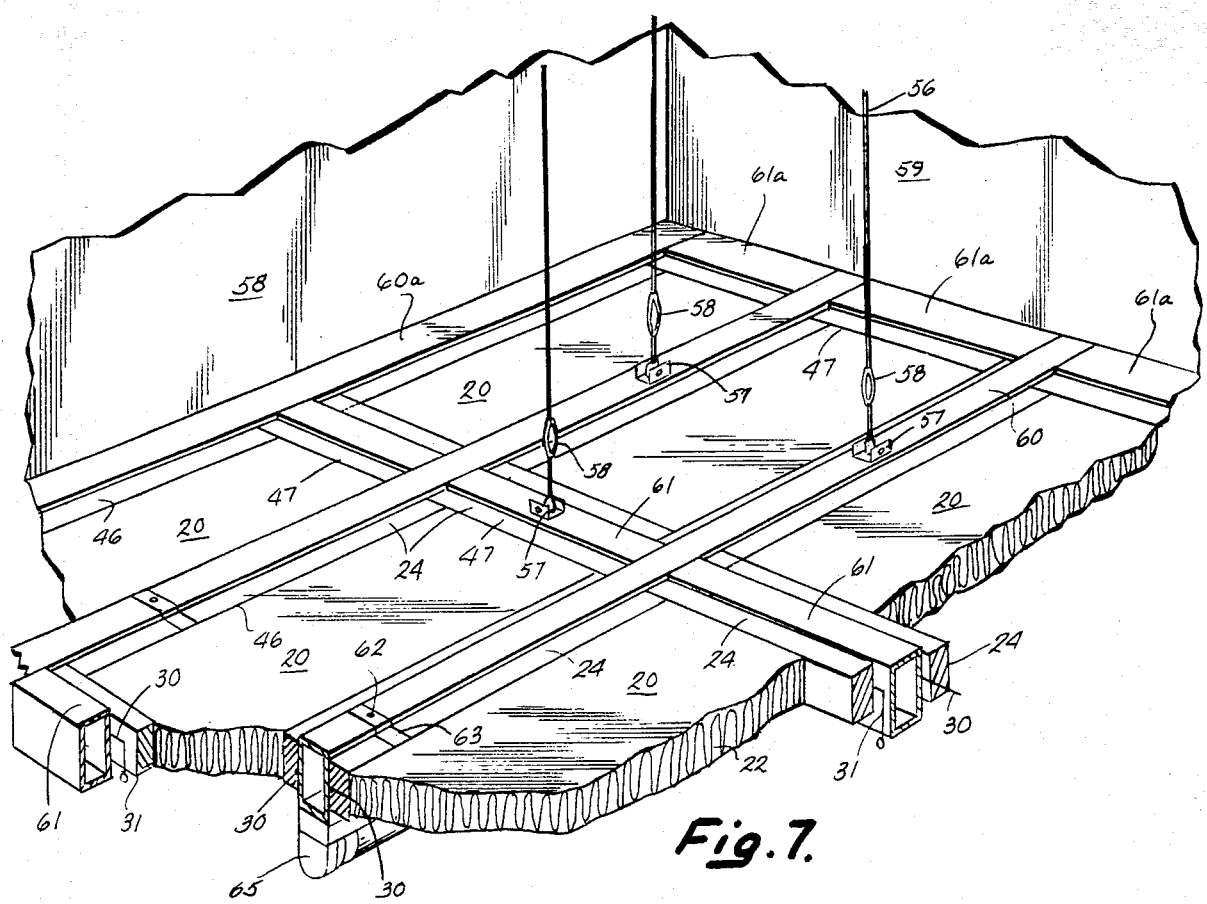
FIG. 7 is a fragmentary, perspective view of a modified version of the present invention for use in a common plenum system.

Another embodiment of the diffuser unit of the present invention, a common plenum unit, is shown in FIG. 7, wherein the support frame for supporting the filter panels above a room and below the room ceiling includes spaced framework members 60 and framework members 61 perpendicular thereto. Framework members 60 and 61 are arranged into a lattice with a plurality of openings therethrough, each opening having a filter panel 20 identical to that previously described positioned therein. As above, each filter panel 20 includes a HEPA filter 22 and a frame 24 with side and end frame members 46 and 47. Clips (not shown) are positioned on the lower, inner edges of framework members 60 on either side of each opening in the framework. The filter supporting clips can be identical to the ones described above or can be modified, as will be described below. The clips hold filter panels 20 in place in the openings in the framework lattice. Retaining clips 62 can be secured to the tops of framework members 61 and 62, each clip having a retaining tab 63 which engages filter frame 24, preventing the filter from being pushed upwardly.

A cutting wire 30 is secured to the outer peripheral edge of each filter frame 24 with a fixed end secured to the filter frame and a free end depending downwardly a sufficient distance such that it protrudes through the applied seal so that the end may be grasped after the panel has been installed.

After each panel has been installed within each opening, a seal made from silicone caulk or the like is applied to the peripheral edges of each filter frame 24 between the filter frame 24 and framework members 60, 61. The seal should envelop the free end of cutting wire 30 and the support clips. The seal should extend upwardly between the filter and support frames to prevent the air above the filter from blowing out the seal. The framework members 60, 61, with filter panels 20 disposed in the openings therein, are suspended from a ceiling (not shown) by cables 56 which are secured to brackets 57 on framework members 60, 61. Turnbuckles 58 can be provided on cables 56 to adjust the level of members 60 and 61.

The filter unit, as shown in FIG. 7, can cover the entire area above the room below the true ceiling between the room's sidewalls, only two sidewalls 58 and 59 being shown. As shown in FIG. 7, framework members 60a and 61a are secured directly to walls 58 and 59. Care should be taken to insure that the securement of members 60a to wall 58 and members 61a to wall 59 is airtight to prevent the pressurized air from being short-circuited around the filters. Any conventional type of sealing arrangement, including silicone caulk, can be employed to effect this airtight securement.

With the filter unit shown in FIG. 7, it is possible to pressurize the entire area above the filter unit and below the true ceiling of the room with air to be filtered, the pressure forcing the air through filters 22 and downwardly into the working space below the filter unit. This arrangement is commonly called a common plenum-type filter unit.

It is not nesessary to use the sidewalls and ceiling of the room as a common plenum; a common plenum can be formed of sheet metal enclosing the area above a plurality of filter panels in a support framework lattice. Such a common plenum unit can be positioned above a portion of a working room with curtains being provided extending around the lower periphery of the common plenum filter unit to the floor of the room.

Figure 8:
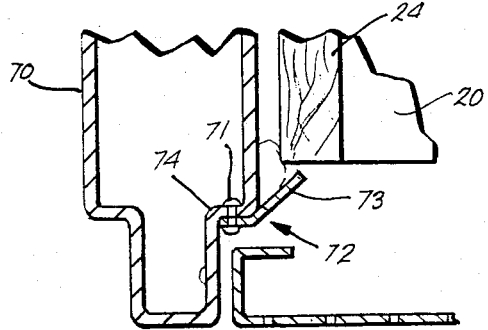
FIG. 8 is an enlarged, fragmentary, sectional view of a modified common plenum diffuser unit employing a modified clip for supporting the filter frame and the filter in the supporting frame.

Other modifications can be made to the filter unit of the present invention. As shown in FIG. 8, for instance, the retaining clip can be modified so that it is riveted to a framework member 70 by a rivet 71, the clip 72 having an upwardly projecting portion 73 which engages the bottom of a frame 24. Clip 72 is pivotal on rivet 71 and should be made from a spring metal so that it can be pivoted underneath flange 74 of framework member 70. With a pivotal clip 72, removal of filter panel 20 is facilitated.

Figure 9:
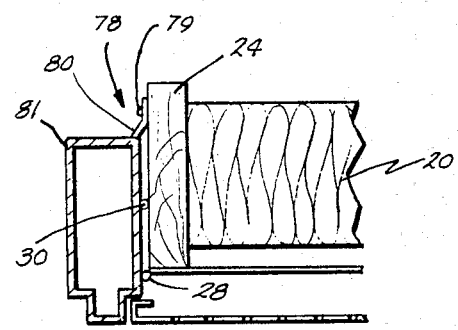
FIG. 9 is a fragmentary, sectional view of a modified common plenum unit illustrating the use of a second modified clip for supporting the filter frame and filter within the supporting frame.

The retaining clip can further be modified, as shown in FIG. 9, to be secured directly to filter frame 24. A clip 78 is secured to the side of filter frame 24 near the top edge of the frame by a screw 79. An outwardly projecting portion 80 engages the top of a support frame member 81, maintaining the filter panel 20 in a raised position within the support frame. A cuttable seal 28, shown in FIG. 9, and a cutting wire 30 are also provided. The advantage to the clip 78 is that seal 28 can be applied without enveloping clip 78 and without gumming up clip 78 in the process. In addition, cutting wire 30 can be pulled downwardly through seal 28 without getting tangled on clip 78.

After seal 28 is cut by wire 30 in the embodiment shown in FIG. 9, filter panel 20 is removed by raising it upwardly and maneuvering it downwardly through the opening in the support frame. Where the clips are below the cutting wire, the wire may ordinarily be forced between the tip of the clip and the underside of the filter frame. The cutting wire arrangement can be modified so that each filter panel 20 has two cutting wires instead of one, whereby the wires will not catch on the retainer clips. Each of the two wires extends half way around the periphery of the filter frame on an opposite side of the frame from the other wire. The fixed end of each seal-cutting wire is secured to the frame above one of the clips on one end of the frame. The free end of each wire extends downwardly on one side of the second retaining clip on the other end of the frame so that when the free end is pulled, it will not catch on the second retaining clip.

As indicated above, it is not necessary to secure the fixed end of the cutting wire to the filter frame. As is apparent, it could be secured to the supporting frame. Of course, it is easier to secure it to the filter frame with staples in the wooden filter frame rather than using a rivet or a screw in the sheet metal supporting frame.

The filter unit with the seal-cutting wire/cuttable seal arrangement is very advantageous. It creates an effective seal between the supporting frame and filter panel. However, the seal is easily cut with the wire for removal of the panel. No time-consuming scraping between the frames is required. In addition, the panel can be removed by an unskilled or semi-skilled worker. In fact. unlike many prior art panels, it is possible for an individual singlehandedly to remove and replace the filter panels. Finally, because fairly standard materials and methods are used in constructing these filter units, they are very inexpensive to produce.

It is expressly intended that the foregoing descriptions should be considered as that of the preferred embodiments. The true spirit and scope of the present invention will be determined by reference to the appended claims.

The embodiments of the invention in which an exclusive property or privilege is claimed are defined as follows:

1. In a clean room having at least one filter panel with a filter frame therearound, a supporting frame within which the at least one filter panel is positioned and a cuttable seal filling the peripheral area between the filter frame of said at least one filter panel and the support frame to prevent unfiltered air from short-circuiting therebetween, the improvement comprising an elongated, flexible cutting member having an end thereof fixedly secured to one of said filter frame and support frame on one side of said cuttable seal, said cutting member having another end thereof exposed and free at the other side of said cuttable seal and having an intermediate length thereof positioned about the periphery of said filter frame on said one side of said cuttable seal whereby when said other end is pulled away from said filter frame said seal will be cut, permitting removal of said filter panel from said supporting frame.

2. The clean room as recited in claim 1 wherein the improvement further comprises releasable clip means affixed to said supporting frame for releasably retaining said at least one filter panel therein.

3. The clean room as recited in claim 2 further including a gridwork and wherein said supporting frame rests on said gridwork.

4. The clean room as recited in claim 3 which further comprises a plenum having a stack connectable to a source of air, and a diverging section sealingly connected to said supporting frame.

5. The clean room as recited in claim 3 wherein the said other end of said elongated, flexible cutting member is positioned and arranged so as to be accessible from below said gridwork.

6. The clean room as recited in claim 2 further including a suspended ceiling framework which includes spaced parallel and perpendicular framework members arranged into a lattice having a plurality of openings therethrough and said supporting framing being a part of said ceiling framework, at least one of said openings having one of said said at least one filter panel positioned therein.

7. The clean room as recited in claim 6 wherein said other end of said elongated, flexible cutting member is positioned and arranged so as to be accessible from below said gridwork.

8. A plenum unit supportable from a ceiling for supplying filtered air to a clean room, said plenum unit comprising:
a supporting frame having an opening therethrough, said supporting frame to be suspended from and supported by a ceiling;
A filter having a filter frame therearound, said filter frame and said filter being installed into said opening, said filter frame being matingly received by said supporting frame;
an elongated, flexible cutting member disposed between said supporting frame and said filter frame around the periphery of said opening, said cutting member having a free end extending below said filter frame and said support frame when suspended from a ceiling, a fixed end fixedly secured to one of said filter or supporting frames, and an intermediate length positioned about the periphery of said filter frame, so that a cuttable seal can be applied between said filter frame and said supporting frame around the periphery of said opening with said fixed end and intermediate length of said member thereabove and said free end of said member therebelow, said seal being cuttable by said member when said free end is pulled downwardly.

9. An air filter comprising a rigid frame having an interior surface and an exterior surface opposite thereto, filter media disposed within and supported by said frame, said media being sealed to said interior surface, and an elongated, flexible cutting member having an end thereof fixedly secured to the exterior surface of said frame, said cutting member having another end thereof free and further having an intermediate length thereof positioned about substantially the entire periphery of said filter frame along said exterior surface.

10. An air filter panel for use in a plenum unit of the type having a generally rectangular support for receiving the air filter panel and a cuttable seal between the panel and the support, said air filter panel comprising:
a generally rectangular frame having an outer peripheral surface;
a filter media supported by said frame;
an elongated, flexible seal cutting member extending around said outer peripheral surface of said frame; and
means engaging said frame for releasably securing said cutting member to said frame, said cutting member having an end secured to said frame and a free end extending from said frame.

11. An air filter as defined by claim 10 wherein said elongated flexible seal cutting member extends around substantially the entire outer peripheral surface of said frame.

* * * * *